(12) United States Patent
Smith

(10) Patent No.: US 7,387,473 B2
(45) Date of Patent: Jun. 17, 2008

(54) APPARATUS AND METHOD FOR CREATING A FLOATING COVER

(76) Inventor: Norman Louis Smith, 1924 Bayview Dr., Seabrook, TX (US) 77586

( * ) Notice: Subject to any disclaimer, the term of this patent is extended or adjusted under 35 U.S.C. 154(b) by 41 days.

(21) Appl. No.: 11/281,170

(22) Filed: Nov. 17, 2005

(65) Prior Publication Data
US 2006/0108269 A1    May 25, 2006

Related U.S. Application Data

(60) Provisional application No. 60/629,367, filed on Nov. 19, 2004.

(51) Int. Cl.
*E02B 3/00* (2006.01)
(52) U.S. Cl. .................................. 405/303
(58) Field of Classification Search ............... 405/303
See application file for complete search history.

(56) References Cited

U.S. PATENT DOCUMENTS

| | | | | |
|---|---|---|---|---|
| 1,671,650 A | * | 5/1928 | Newman et al. ............ 169/57 |
| 3,665,882 A | * | 5/1972 | Georgiev et al. .......... 114/266 |
| 3,917,271 A | * | 11/1975 | Lemelson et al. ......... 473/573 |
| 3,938,338 A | * | 2/1976 | Cullen ...................... 405/21 |
| 3,993,214 A | * | 11/1976 | Usab ......................... 220/218 |
| 3,998,204 A | * | 12/1976 | Fuchs et al. ............... 126/565 |
| 4,270,232 A | * | 6/1981 | Ballew ........................ 4/498 |
| 4,458,688 A | | 7/1984 | Von Behren |
| 4,467,786 A | | 8/1984 | Sorensen |
| 4,582,048 A | | 4/1986 | Sorensen |
| 4,749,606 A | | 6/1988 | Moore |
| 5,125,355 A | * | 6/1992 | Stranzinger .............. 114/266 |
| 5,188,550 A | * | 2/1993 | Oliver ......................... 441/1 |
| 5,350,330 A | * | 9/1994 | Platis ......................... 441/6 |
| 6,199,797 B1 | * | 3/2001 | Brown ...................... 244/105 |
| 2006/0054553 A1 | * | 3/2006 | Kruse et al. ............... 210/620 |

FOREIGN PATENT DOCUMENTS

DE        3032763 A1  *  7/1982

OTHER PUBLICATIONS

Erdos, et al. "Floating equilibrium of symmetrical objects and the breaking of symmetry. Part 2: The cube, the octahedron, and the tetrahedron" Apr. 1992 Am.J.Phys. 60 (4) pp. 345-356.*

* cited by examiner

*Primary Examiner*—John Kreck
(74) *Attorney, Agent, or Firm*—Osha Liang LLP

(57) ABSTRACT

A system for reducing an evaporation and energy transfer rate between a body of fluid and an environment is provided. The system comprises a plurality of buoyant bodies, where each of the plurality of buoyant bodies has a shape that is defined by a plurality of faces and edges, and where each edge is formed by two intersecting faces. The bodies are disposed or partially submerged in the fluid so that at least a portion of a first face of a first body contacts at least a portion of a first face of a second body to form a substantially gapless barrier between the surface of the fluid and the environment.

16 Claims, 9 Drawing Sheets

APPARATUS AND METHOD FOR CREATING A FLOATING COVER

CROSS-REFERENCE TO RELATED APPLICATIONS

This application claims priority, pursuant to 35 U.S.C. § 119(e), of U.S. Provisional Application Ser. No. 60/629,367 filed on Nov. 19, 2004.

BACKGROUND OF INVENTION

Reducing pollutants (which may result from fluid evaporation) and/or fluid loss generally are major concerns for both industry and the public. These concerns are often of particular concern in the chemical and petroleum industries where substantial sums of money are lost yearly due to the evaporation of volatile substances. Moreover, environmental concerns require stringent regulation of fluid pollutants and toxins contained in standing fluids; thus, evaporation of volatile substances pose both an environmental and a financial burden.

Moreover, these concerns are not limited to bodies of toxic fluids. For example, the evaporation of non-toxic materials is also problematic in regions permanently subjected to arid weather or areas temporarily experiencing unusual drought conditions. The reduction of evaporation or the control of energy transfer may be critical to the viability of industry in those geographical regions.

The phase change process that occurs during evaporation of a fluid may be influenced by a variety of factors. Factors that drive the evaporation rate, typically expressed in pounds of product per minute, include wind speed, the molecular weight of the fluid constituents, the exposed surface area of the fluid, vapor pressure of the fluid, and temperature. Even a small evaporation rate extended over a relatively long period of time can result in a very large loss of product.

One method of controlling evaporation is to reduce the surface area of the fluid exposed to the environment. In prior art systems, hollow plastic spherical balls have been used to cover the fluids surfaces and reduce evaporation. When deposited on a body of fluid, balls of similar size arrange themselves into a close-packed cover, often referred to as a ball blanket or floating blanket. Plastics frequently selected to make the prior art balls include high-density polyethylene, polypropylene, and polyvinylidene fluoride, depending on the temperature, sunlight exposure, and properties of the fluid and environment where the balls will be used.

Such floatable balls can cover only approximately 91% of the surface of the fluid because their spherical configuration only allows them to engage in point-to-point contact. Hence, prior art balls provide a floating ball blanket that has a plurality of gaps. These gaps leave open space for fluid loss by evaporation, heat loss by such evaporation, and heat transfer by convection from the surface of the fluid. It has also been found in actual practice that because such spherical floatable balls float high in the fluid, much less than 91% of the fluid surface is in contact with the ball. Thus, surface evaporation and heat transfer by convection are not sufficiently reduced as may be desired.

Furthermore, the spherical shape of the floatable ball allows each ball to roll freely as the fluid is agitated or exposed to wind. This rolling action may produce further loss of fluid as the fluid that wets the bottom of the ball surface readily evaporates when it is rolled upwardly and is exposed to the atmosphere.

Consequently, systems have been developed that more completely cover the fluid surface and/or prevent rolling of the floating balls. Typical of such an approach is the device set forth in U.S. Pat. No. 3,998,204. The '204 patent describes a floatable ball having contoured flat surfaces surrounding its equatorial plane. The ball is rigid and contains ballast in its bottom portion so that its flat surfaces are vertically oriented and juxtaposed to each other. When the fluid surface is uniform or non-oscillatory, the collective surface-to-surface contacts between the equatorial planes of these balls provide a substantially gapless or uninterrupted floating ball blanket. Similarly, U.S. Pat. No. 5,188,550 discloses a plurality of buoyant devices having more substantial flat vertical surfaces for greater coverage in undulating surface conditions. As is known to those skilled in the art, these approaches allow a floating device to float upright when the center of gravity of the device is sufficiently below the center of buoyancy of the fluid. Because the center of buoyancy is partly determined by the center of gravity of the fluid, such approaches are limited in application to fluids having specific gravities, i.e. densities, that are within a relatively limited range.

Other prior art evaporation and energy reduction techniques and systems which cumulatively form a barrier are disclosed in U.S. Pat. Nos. 4,749,606; 4,582,048; 4,467,786; 4,458,688 and 4,270,232. As is known to those skilled in the art, these devices and techniques suffer barrier breach when confronted with undulatory surface conditions.

Thus, there still exists a need for a better approach to provide a barrier that can function effectively on a variety of fluids and under a variety of environmental conditions including undulating fluid surfaces, but which is also easy to deploy and economical to manufacture and maintain.

SUMMARY OF INVENTION

In one aspect, the present invention relates to a system for reducing an evaporation rate of a fluid. The system has a plurality of buoyant bodies disposed on or partially submerged in a fluid. Each buoyant body has a plurality of faces and edges defining a shape thereof, and each edge is formed by two intersecting faces thereof. The plurality of buoyant bodies are disposed on or partially submerged in the fluid so that at least a portion of a first face of a first body contacts at least a portion of a first face of a second body to form a substantially gapless barrier between the surface of the fluid and an environment.

In another aspect, the present invention relates to a method for controlling evaporation and transfer of energy between a body of fluid and an environment by disposing a plurality of buoyant bodies on the body of fluid in a sufficient quantity so that the buoyant bodies self-assemble to form a substantially gapless barrier covering at least a portion of the body of fluid, wherein each buoyant body comprises a plurality of faces that define a shape thereof.

In another aspect, the present invention relates to a system for controlling evaporation and transfer of energy between a body of fluid and an environment. The system has a plurality of buoyant bodies disposed on or partially submerged in the fluid, where each buoyant body has four faces defining a shape thereof and six edges formed by two intersecting faces thereof. The plurality of buoyant bodies are disposed on or partially submerged in the fluid so that at least a portion of a first face of a first body contacts at least a portion of a first face of a second body to form a substantially gapless barrier between a surface of the fluid and the environment.

Other aspects and advantages of the invention will be apparent from the following description and the appended claims.

DETAILED DESCRIPTION

Figure 1:
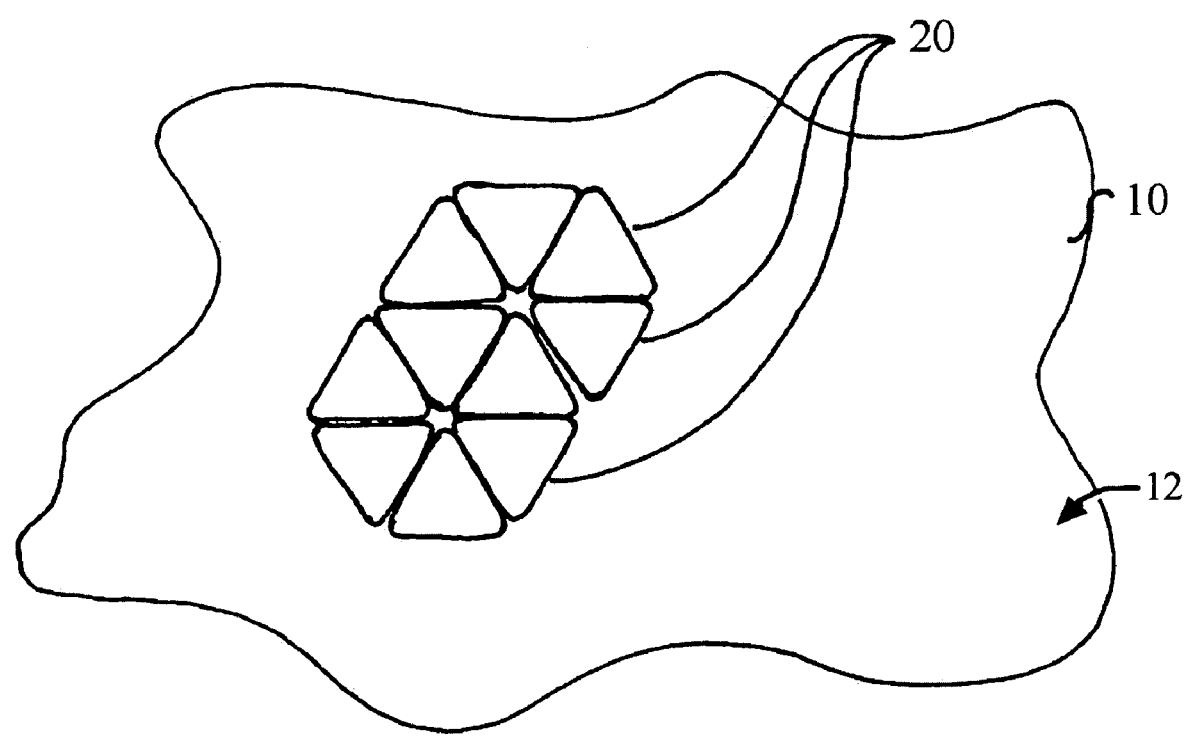
FIG. 1 shows a top plan view of an aggregate of buoyant bodies having four sides, according to one embodiment of the present invention, partially covering a body of fluid.

Embodiments of the present invention provide a system and a method for reducing the rate of evaporation and energy transfer between a body of fluid and an environment. As noted above, the evaporation and energy loss of a fluid can be reduced by decreasing surface area of the fluid that is exposed to the environment above. In one embodiment, a body of fluid having at least a portion of surface covered by buoyant bodies may allow for a reduction of evaporation and energy transfer.

In general, a buoyant body according to some aspects of the present invention includes a plurality of faces that define its shape and a plurality of edges, where each edge is formed by two intersecting faces. The buoyant body may be designed such that when a sufficient number of like buoyant bodies are placed on a body of fluid, they may aggregate and form a substantially gapless barrier separating the fluid from an environment above.

The edges of a buoyant body may be rounded or beveled. The overall shape of the buoyant body is preferably symmetric. Suitable shapes may include any regular geometric shapes that are capable of forming repeating patterns with a minimum amount of inter-body gaps when tiled together in a two dimensional array arrangement. Examples of such geometric shapes include, but are not limited to, regular prisms such as triangular prisms, cuboidal prisms, hexagonal prisms, and regular polyhedrons such as tetrahedron, and octahedron. A buoyant body that has a regular geometric shape with flat faces may increase its propensity to remain upright because of the substantial righting arm between the center of gravity (CG) and the center of buoyancy (CB) during heel. As dictated by the principles of physics, the combination of a wide body, or form, and low center of gravity increases the buoyant stability when equilibrium is established. Should the device overturn in undulating surface conditions, another stable position results because the device is symmetric.

In another embodiment, a suitable shape for a buoyant body may include a pyramidal polyhedron where the buoyant body has a polygonal base face and triangular side faces. Examples of such pyramidal shapes include a triangular pyramid, square pyramid, and pentagonal pyramid.

In some embodiments, a buoyant body of the present invention may be a uniform body comprised of a relatively low density material such as polypropylene, high density polyethylene, polyvinylidene fluoride, acrylonitrile butadiene styrene (ABS), certain cellulosics, nylon, certain polyethylenes such as polyethylene terephthalate (PET), low density polyethylene (LDPE), polystyrene, rigid polyvinyl chloride (PVC), or any other low density material known in the art.

In other embodiments, a buoyant body of the present invention may further be coated with a reflective material to deflect radiant energy. Examples of suitable coating may include aluminum plating, chromium plating, titanium nitride plating, and reflective paint.

In other embodiments, the buoyant body may be comprised of a transparent material to allow visual inspection of the fluid underneath. Examples of suitable transparent materials may include polycarbonates, certain polyethylenes, acrylics, and polyethylene terephthalate (PET).

In yet other embodiments, a buoyant body may comprise a substantially hollow interior to obtain the desired buoyancy. In those embodiments that have hollow interior, it will be understood that the thickness of the walls must be sufficient to withstand impact forces generated during mass deployment. For example, typical thicknesses for high density polyethylene are about 0.030 to 0.090 inches. It will also be understood that any relatively rigid material may also be suitable just as long as the overall volumetric density is substantially less than the fluid it occupies to maintain buoyancy. For example, a buoyant body according to one embodiment of the present invention may be comprised of high density polyethylene because the material properties of high density polyethylene are favorable for rigidity while permitting buoyancy in the hollow portion.

In another embodiment, the interior of a buoyant body may be filled with a low thermal conductivity substances such as argon, neon, and carbon dioxide. This low thermal conductivity substance may be sealed in the interior of the buoyant body and act to insulate a body of fluid on which the buoyant body is placed from environmental factors. For example, a body of fluid having a temperature lower than the environment above may be partially insulated from the hotter air temperatures because the low thermal conductivity substance contained in the buoyant bodies may slow thermal conduction from the air to the fluid, thereby maintaining a relatively uniform fluid temperature. Conversely, when the temperature of a fluid is greater than the temperature of the environment above, the low thermal conductivity substance may act as an insulating blanket to reduce the rate of heat lost, thereby maintaining a relatively uniform fluid temperature.

In yet another embodiment, the interior of the buoyant body may further comprise a plurality of hollow chambers. The internal chamber structure may act to strengthen the mechanical strength of a buoyant body. It may also provide a mechanism to extend the useful life of a hollow buoyant body in situations where the outer wall of a buoyant body is breached. In such situations, the chambers compartmentalize the hollow interior space and limit the breach to only a few compartments, thereby extending the useful life of the buoyant body.

In other further embodiments, a buoyant body of the present invention may comprise a substantially solid interior, a relatively rigid foam, or any other combinations of materials known in the art that may have suitable buoyancy. Examples of suitable materials include polystyrene foam, polyvinyl chloride (PVC) foam, cork, and rigid polyurethane foam.

Figure 2:
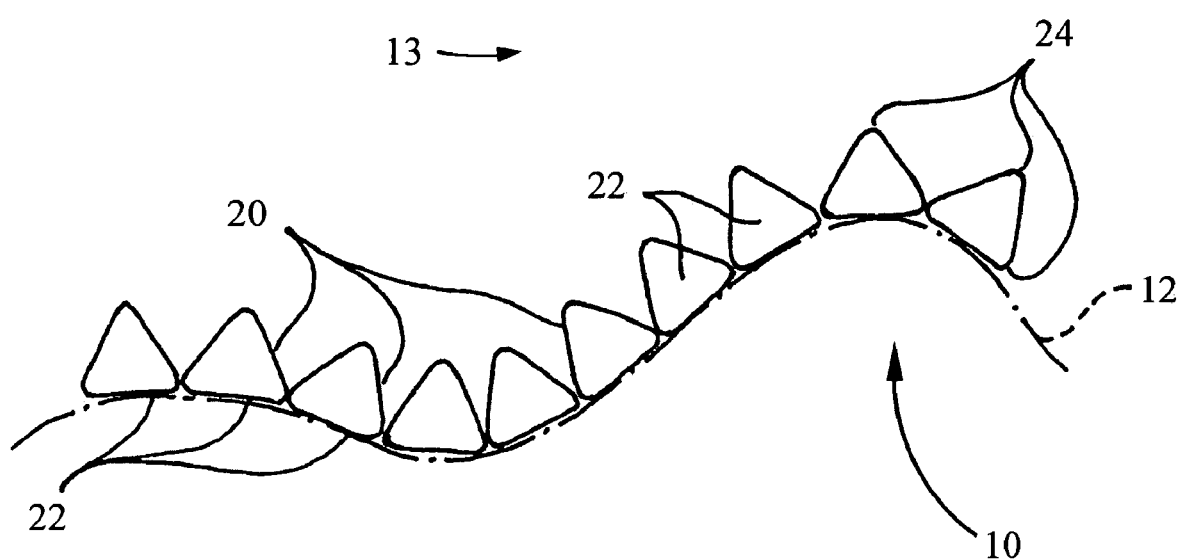
FIG. 2 shows a side view of the aggregate in FIG. 1.

Referring to FIGS. 1 and 2, a plurality of buoyant bodies 20 according to one embodiment of the present invention is shown as an aggregated cluster floating on a body of fluid 10 having a surface 12 that may undulate. While the buoyant bodies are shown in FIG. 2 as floating on the fluid surface, in an alternative embodiment, they may be partially submerged in the fluid. A face 22 of each buoyant body 20 makes contact with the fluid surface 12, while the edges 24 of the fluid-contacting face 22 may contact other similarly positioned edges 24 of neighboring buoyant bodies 20 to form a contiguous monolayer that effectively separates the fluid 10 from the environment 13 above the fluid.

Figure 3:
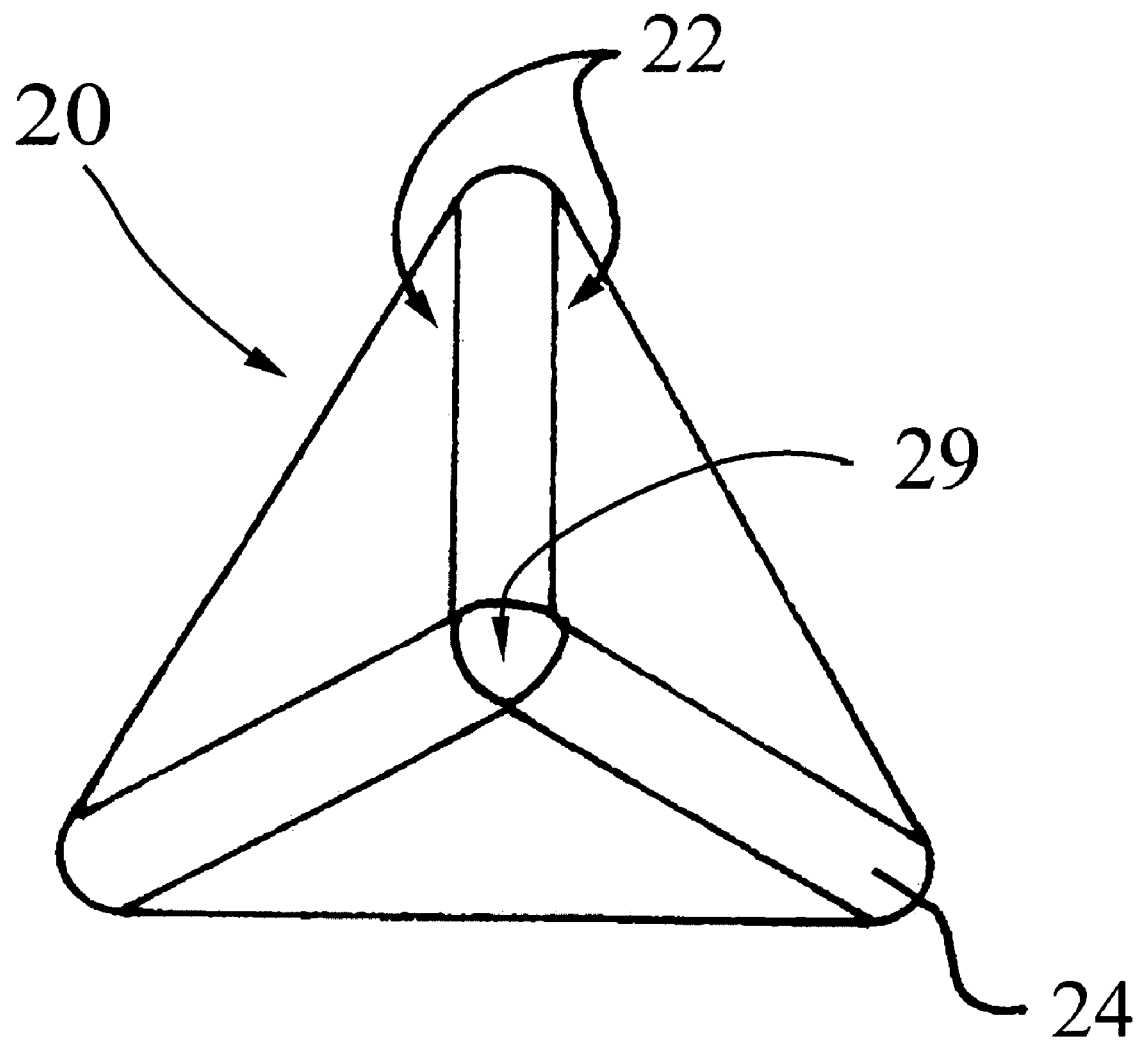
FIG. 3 shows a top plan view of a tetrahedral buoyant body with rounded edges according to one embodiment of the present invention.

Referring to FIG. 3, a single buoyant body 20 of FIG. 1 is shown. Buoyant body 20 includes a plurality of faces 22 that define a shape of the buoyant body, and a plurality of edges 24, where each edge is formed by two intersecting faces 22. In this embodiment, the overall shape of the buoyant body 20 is tetrahedral, i.e. buoyant body 20 has four equilateral triangular faces 22 with edges 24 of equal length. In this embodiment, because each of the four faces 22 are substantially identical, any face 22 can function as the fluid-contacting face 22 when the buoyant body is floating on a body of fluid 10, as shown in FIG. 2. The edges 24 and the vertices 29 may also be rounded to allow better contact transitions between adjacent buoyant bodies.

Figure 4:
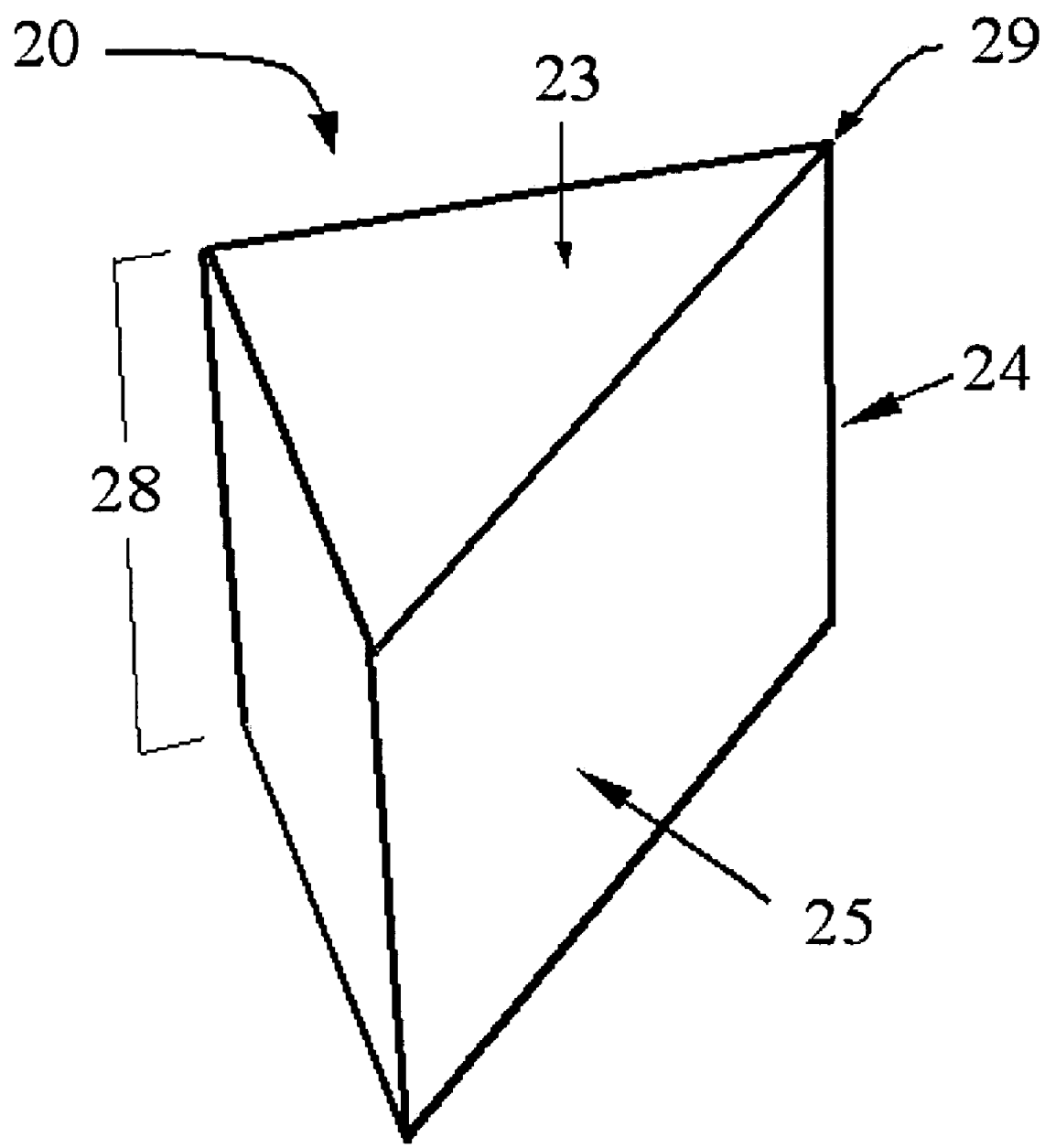
FIG. 4 shows a perspective view of a buoyant body having a triangular prim shape according to one embodiment of the present invention.
Figure 5:
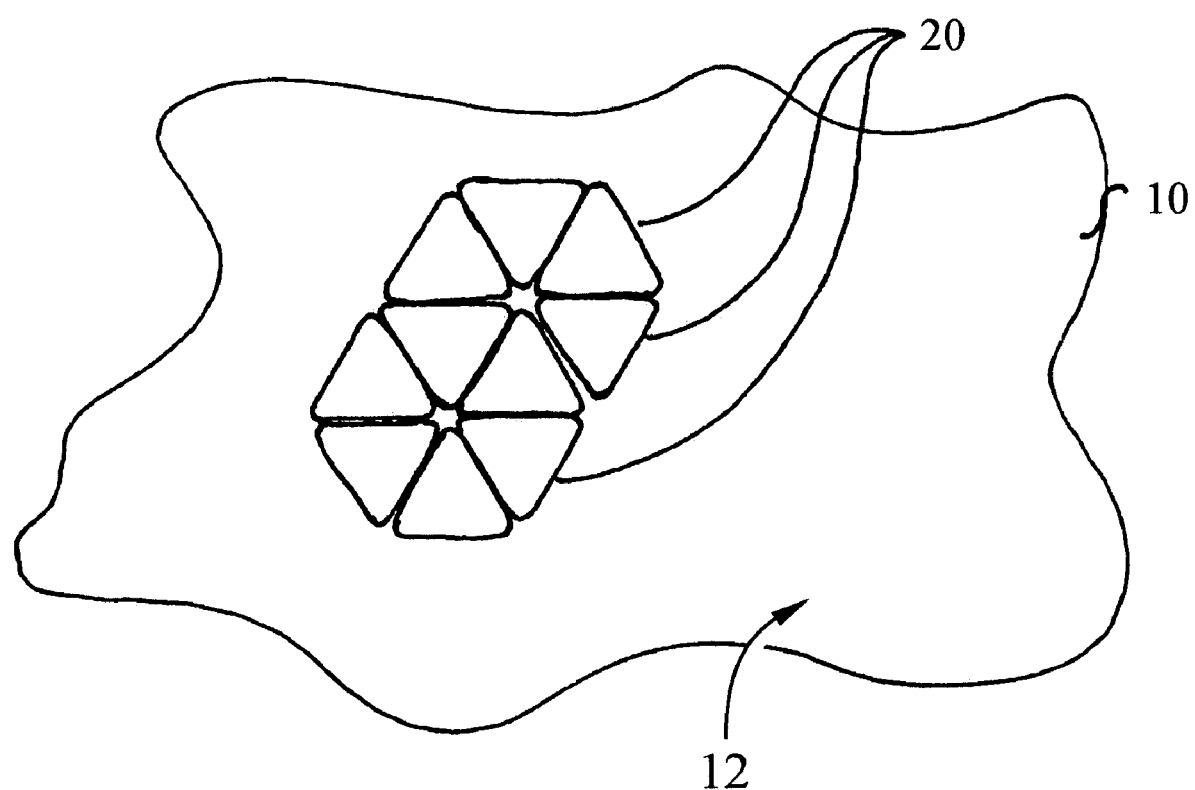
FIG. 5 shows a top plan view of an aggregate of triangular prism buoyant bodies, according to one embodiment of the present invention, partially covering a body of fluid.

Referring now to FIG. 4, according to one embodiment of the present invention, the overall shape of a buoyant body 20 may be a regular triangular prism. In this embodiment, the bases 23 of the buoyant body 20 may be equilateral triangles. The side faces 25 of the buoyant body 20 may be rectangular. The vertices 29 and the edges 24 of the buoyant body 20 may be rounded. The height 28 of the prism is generally less than one half the diameter of a circle circumscribing the triangular face, preferably in the range of 1 inch to 8 inches diameter. Referring to FIG. 5, buoyant bodies 20 of FIG. 4 are shown aggregating on a fluid 10. From FIG. 5, it can be appreciated that when buoyant bodies 20 having like shape and size abut in a sufficiently compact manner, a substantially gapless barrier may be formed that effectively closes off the fluid surface 12 of the body of fluid 10 from the environment above (not shown separately).

Figure 6:
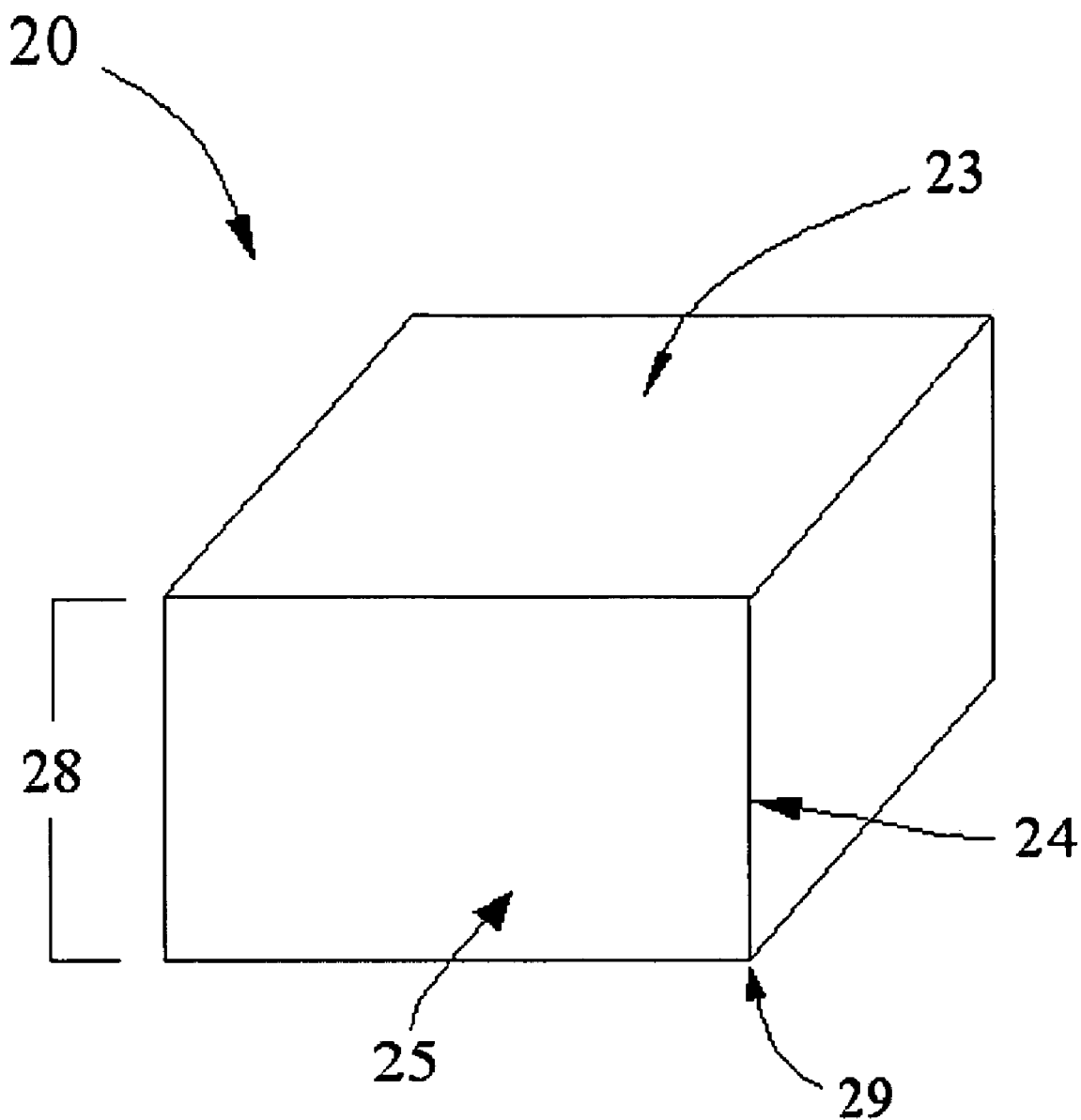
FIG. 6 shows a perspective view of a cuboid buoyant body according to one embodiment of the present invention.
Figure 7:
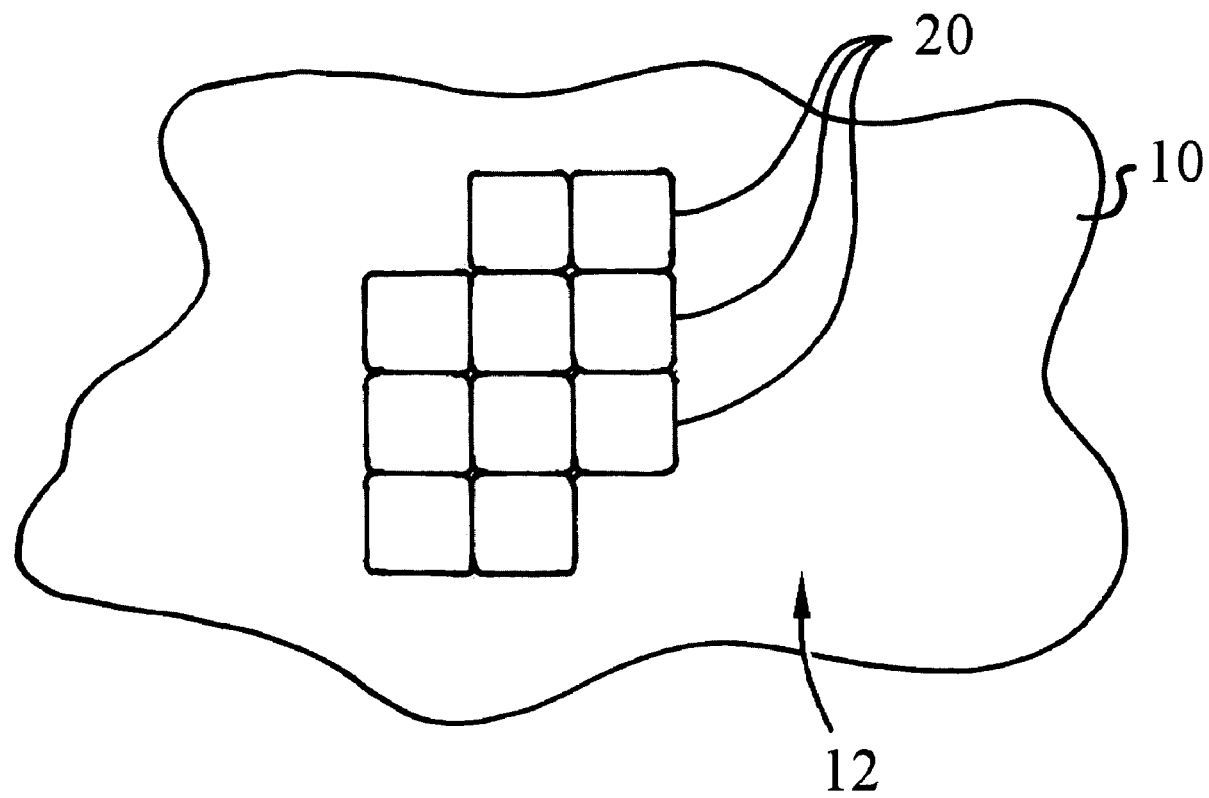
FIG. 7 shows a top plan view of an aggregate of cuboid buoyant bodies, according to one embodiment of the present invention, partially covering a body of fluid.

FIG. 6 shows another embodiment of the present invention in which the overall shape of a buoyant body 20 may be a square prism or a cuboid. In this embodiment, the bases 23 of the buoyant body 20 may be square. The side faces 25 of the buoyant body 20 may be rectangular (in the case of a square prism) or square (in the case of a cuboid). The vertices 29 and the edges 24 of the buoyant body 20 may be rounded. The height 28 of the prism is generally less than one half the diameter of a circle circumscribing the square face, preferably in the range of 1 inch to 8 inches diameter. From the top plan diagrammatic view of FIG. 7, it can be appreciated that when other like buoyant body 20 having like shape and size abut in a sufficiently compact manner, a substantially gapless barrier may be formed that effectively closes off the fluid surface 12 of the body of fluid 10 from the environment above (not shown separately).

Figure 8:
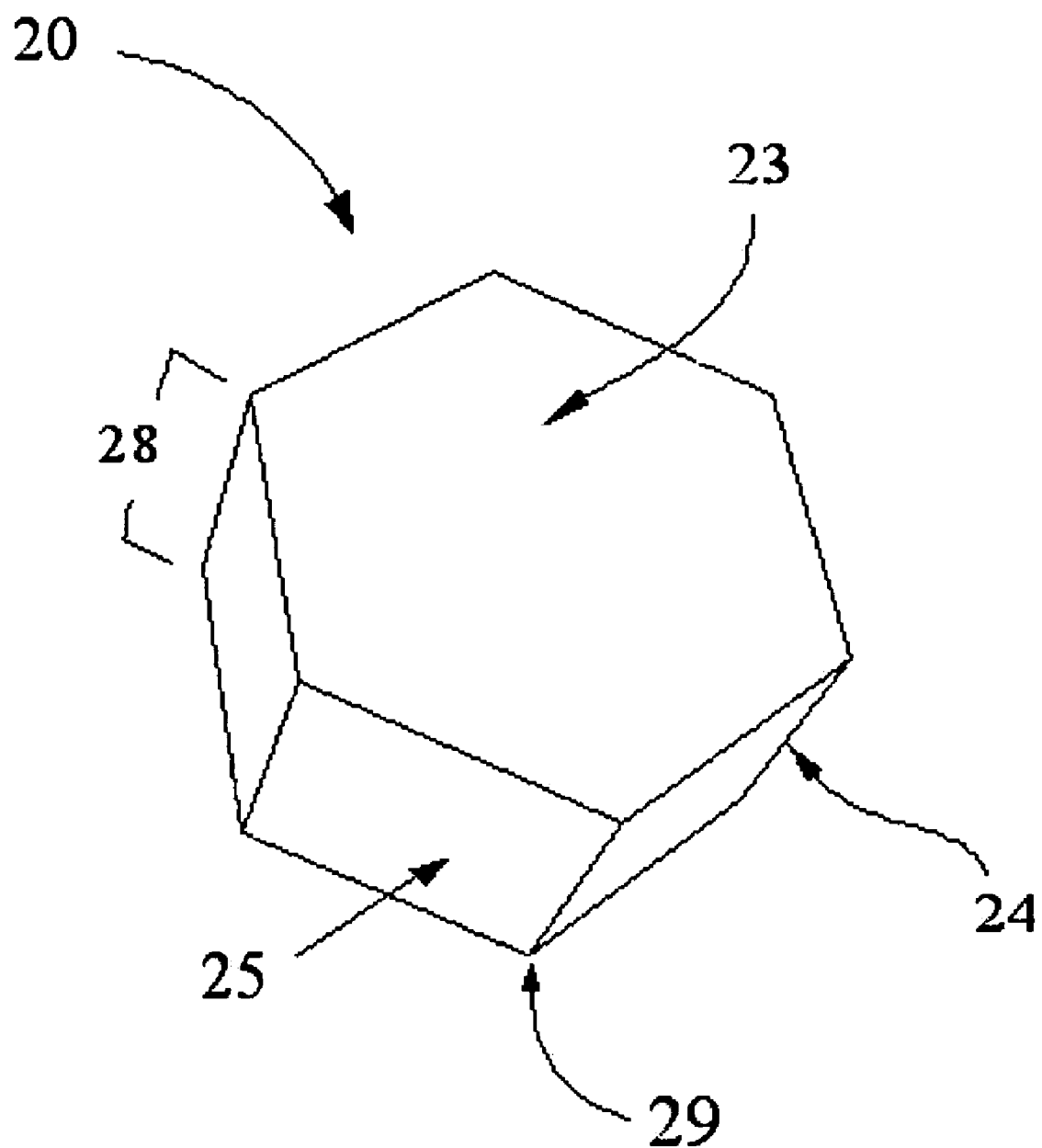
FIG. 8 shows a perspective view of a hexagonal prism buoyant body according to one embodiment of the present invention.
Figure 9:
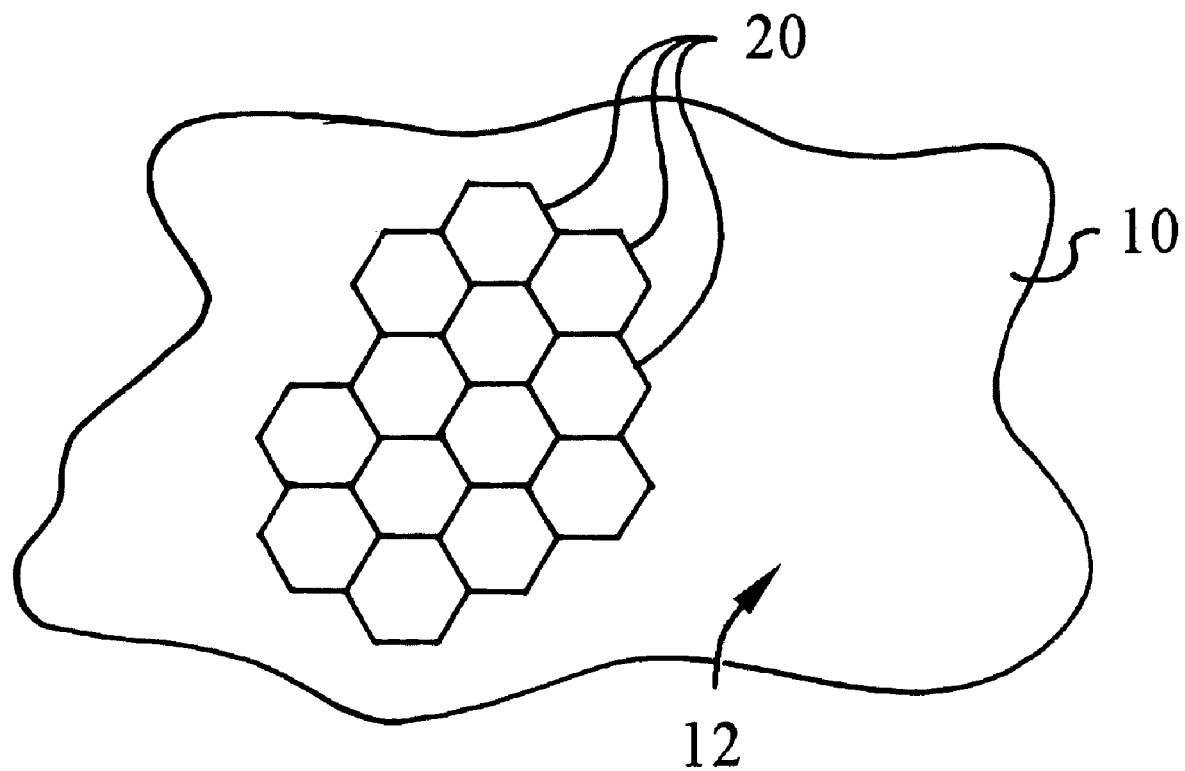
FIG. 9 shows a top plan view of an aggregate of hexagonal prism buoyant bodies, according to one embodiment of the present invention, partially covering a body of fluid.

FIGS. 8 shows yet another embodiment of the present invention in which the overall shape of a buoyant body 20 may be a hexagonal prism. In this embodiment, the bases 23 of the buoyant body 20 may be hexagonal. The side faces 25 of the buoyant body 20 may be rectangular. The vertices 29 and the edges 24 of the buoyant body 20 may be rounded. The height 28 of the prism is generally less than one half the diameter of a circle circumscribing the hexagonal face. Referring to FIG. 9, buoyant bodies 20 of FIG. 8 are shown aggregating in a fluid 10. From FIG. 9, it can be appreciated that when other like buoyant bodies 20 having like shape and size abut in a sufficiently compact manner, a substantially gapless barrier may be formed that effectively closes off the fluid surface 12 of the body of fluid 10 from the environment above (not shown separately).

In other embodiments, non-prism or polyhedral shapes are also possible. It will be appreciated by a person skilled in the art that any geometric shape that is capable of being aggregated to form a substantially gapless, contiguous barrier may be suitably employed. The term "substantially" as used herein means that the total area occupied by the gaps is less than 9% of the total area covered by the blanket formed by the aggregated buoyant bodies, preferably less than 5%.

Method for Forming a Barrier Using a Plurality of Buoyant Bodies

Referring again to FIG. 1, a method for forming a barrier between a body of fluid 10 and an environment is described. As shown in FIG. 1, when several buoyant bodies 20 according to embodiments of the present invention are initially introduced to a body of fluid 10, the bodies may float, drift, tumble and roll in response to undulating undercurrents of the fluid. As more of like buoyant bodies 20 are introduced, the individual bodies 20 may randomly collide with each other. Because of their complementary symmetry, once in contact with each other, the faces 22 and edges 24 of the individual buoyant bodies 20 align with the faces 22 and edges 24 of neighboring buoyant bodies 20 and initiate a process of self-organization to form a contiguous, substantially gapless monolayer. Moreover, because the organizing principle of the monolayer is shaped complementarily, the individual buoyant bodies 20 are not rigidly bound to each other and are, therefore, capable of adapting to changing environmental conditions such as undulating waves, winds, etc. When a monolayer as described above is temporarily disrupted by transient environmental factors, it is capable of self-reorganization after the disrupting factors have dissipated.

Moreover, because the faces 22 and the edges 24 of the buoyant bodies 20 form a substantially gapless barrier via slidable contacts to the periphery of neighboring bodies 20, when an irregular, undulating fluid surface 12 exists, a barrier according to the present invention may remain substantially gapless or contiguous. In FIG. 2, fluid surface 12 is shown oscillating in an undulatory manner whereby faces 22 and edges 24 form slidable contacts around common peripheries of similarly formed bodies 20 to continuously maintain an effective evaporatory seal. Thus, a barrier formed according to a method as described above effectively forms a stable, self-organizing, self-maintaining, and self-sealing barrier that blocks off a fluid surface 12 from an environment 13, as shown in FIG. 2.

Method for Manufacturing a Buoyant Body

Buoyant bodies according to embodiments of the present invention may be formed by blow molding or injection molding, or any other fabrication methods commonly known in the art. In one embodiment, a buoyant body having a substantially hollow interior may be formed by a plastic blow molding process. It will be apparent to those skilled in the art that a multi-piece mold that clamps the parison in orthogonal directions, top and bottom, will result in a part molded with relatively uniform wall thickness. It will also be apparent to those skilled in the art that a hollow body formed by a plastic blow molding process may be further sealed by fusing a plug of similar material as the body into the blow port. It will be appreciated, however, that a hollow body according to the embodiments of the present invention may be sealed by a variety of methods, such as plastic welding, ultrasonic welding, heat sealing, and the use of sealants or adhesives.

Alternatively, a floating cover device according to embodiments of the present invention may be formed by plastic injection molding where the device is formed in two halves that are then sealed together. It will be appreciated, however, that a buoyant body according to embodiments of the present invention may also be produced by a variety of methods, such as rotational molding, twin-sheet thermoforming, injection molding, selective laser sintering, and milling, without departing from the true scope of the present invention.

The various embodiments of the present invention as described above provide one or more of the following advantages. As mentioned above, a buoyant body having a regular, symmetric, shape such as a polyhedron or a prism has the advantage of increased rotational stability which reduces the frequency of turning when deposited on the surface of a body of fluid. A barrier comprised of buoyant bodies according to embodiments of this invention are particularly effective when the perimeter of a body of fluid is irregularly shaped. Moreover, in a body of fluid having gradually sloped side walls, decreases in fluid height will not degrade surface coverage because the individual devices will merely come to rest on the sloped surfaces. Coating a floating device with a reflective material according to the present invention enhances the ability of the floating devices to insulate a body of fluid from environmental factors. For example, chilled fluids may be partially insulated from direct sunlight because the rays impinging on the floating cover devices will be reflected, thereby reducing radiation and conduction energy. Accordingly, a relatively uniform fluid temperature may be maintained.

Although the present invention has been described in terms of specific exemplary embodiments, it will be appreciated that the embodiments disclosed herein are for illustrative purposes only and various modifications and alterations might be made by those skilled in the art without departing from the spirit and scope of the invention as set forth in the following claims.

What is claimed is:

1. A system for reducing an evaporation rate of a fluid, comprising:
    a plurality of buoyant bodies disposed on or partially submerged in a fluid, each buoyant body comprising:
        a plurality of faces, where the plurality of faces define a shape of the buoyant body;
        a plurality of edges, where each edge is formed by two intersecting faces;
        wherein only one of the plurality of faces is substantially disposed on or submerged in the fluid,
    wherein the plurality of buoyant bodies are disposed on or partially submerged in the fluid so that at least a portion of a first body contacts at least a portion of a second body to form a substantially gapless barrier between the surface of the fluid and an environment; and
    wherein the shape of each buoyant body is a regular tetrahedron.

2. The system of claim 1, wherein at least one buoyant body comprises a low density material.

3. The system of claim 1, wherein the plurality of edges are rounded.

4. The system of claim 1, wherein at least one buoyant body further comprises a reflective coating on the plurality of faces.

5. The system of claim 1, wherein an interior of at least one buoyant body comprises a low thermal conductivity substance.

6. A method for controlling evaporation and transfer of energy between a body of fluid and an environment, comprising:
    depositing a plurality of buoyant bodies on the body of fluid in a sufficient quantity so that the buoyant bodies self-assemble to form a substantially gapless barrier covering at least a portion of the body of fluid,
    wherein each buoyant body comprises a plurality of faces that define a shape of the buoyant body,
    wherein only one of the plurality of faces is substantially disposed on or submerged in the body of fluid; and
    wherein the body of the floating devices is a regular tetrahedron.

7. The method of claim 6, wherein at least one buoyant body self-rights into an upright position when deposited on the body of fluid.

8. The method of claim 6 further comprising:
    depositing a reflective coating on the plurality of faces, whereby the reflective coating further enhances insulation of energy transfer.

9. The method of claim 6 further comprising:
    filling the hollow interior of the at least one of the plurality of buoyant bodies with a low thermal conductivity substance.

10. A system for controlling evaporation and transfer of energy between a body of fluid and an environment, comprising:
    a plurality of buoyant bodies disposed on or partially submerged in the fluid; each buoyant body comprising:
        four faces, wherein the faces define a tetrahedral shape of the buoyant body;
        six edges, wherein each edge is formed by two intersecting faces;
        wherein only one of the four faces is substantially disposed on or submerged in the fluid,
    wherein the plurality of buoyant bodies are disposed on or partially submerged in the fluid so that at least a portion of a first edge of a first body contacts at least a portion of a first edge of a second body to form a substantially gapless barrier between a surface of the fluid and the environment,
    wherein at least one of the plurality of buoyant bodies is substantially hollow, and
    wherein a thickness of at least one of the four faces of the at least of the plurality of buoyant bodies is selected from a range of about 0.030 to 0.090 inches.

11. The system of claim 10 wherein at least one buoyant body self-rights into an up-right position when deposited on the body of fluid.

12. The system of claim 10 wherein at least one buoyant body comprises a low density material.

13. The system of claim 10 wherein at least one buoyant body is coated with a reflective coating.

14. The system of claim 10 wherein the interior of at least one buoyant body is filled with a low thermal conductivity gas.

15. The system of claim 10 wherein the substantially gapless barrier comprises less than 5% of gaps by total area of the barrier.

16. The system of claim 1, wherein at least one of the plurality of buoyant bodies is substantially hollow.

* * * * *